Patented May 1, 1945

2,374,931

UNITED STATES PATENT OFFICE 2,374,931

WAX COMPOSITION

William C. Griffin, Tamaqua, Pa., assignor to Atlas Powder Company, Wilmington, Del., a Corporation of Delaware No Drawing. Application March 26, 1942, Serial No. 436,255

18 Claims. (Cl. 106—211)

The present invention relates to improvements in wax compositions.

An object of the invention is to provide a solid wax composition which is dispersible in aqueous media.

A particular object is to provide novel wax compositions which are dispersible in laundry starching solutions to form wax dispersions suitable for application to fabrics to assist a subsequent ironing operation on said fabrics.

Another specific object is to provide a laundry starching solution containing a novel dispersion of a waxy material suitable for application to fabrics to assist a subsequent ironing operation.

A further object of the invention is to provide homogeneous solid dispersible wax compositions.

A still further specific object is to provide a solid dispersible laundry wax composition containing an aqueous dye solution dispersed homogeneously therein.

The above and other objects will become apparent in the course of the following description and claims.

The present application is a continuation-in-part of my two copending applications, Serial Number 367,017, filed November 25, 1940, and Serial Number 395,392, filed May 27, 1941.

As described more fully in the above-identified applications, emulsions of waxes in water are of wide commercial utility for coatings, impregnating compositions and the like. Because the waxes are not self-emulsifiable in water, it is necessary to use emulsifying agents to prepare the useful emulsions. In my said applications I have disclosed a novel emulsifier which is a mixture of two chemical types of emulsifiers. Emulsions of waxes in water can be prepared in various ways using this mixed emulsifier. For many purposes it is impossible or very undesirable to have to measure or weigh the wax and two emulsifiers before making the emulsion. In applications where the ultimate consumer is to make the emulsion, for example, the equipment and degree of skill necessary to prepare good emulsions of constant properties by this method are lacking generally. I have discovered that the mixed emulsifier can be incorporated with the wax to form a wax composition which is readily dispersible in warm or hot water. It is with this invention that the present application is concerned.

The invention is particularly valuable in the art of laundering and will be described in detail as applied to this art, it being understood, however, that the dispersible wax compositions are useful in other fields either directly or with suitable modifications.

In the starching of fabrics for sizing or finishing purposes in this art, the use of wax in the starching medium to function as a lubricant during the ironing operation is well known. It is here of the utmost desirability that the wax be maintained in an effective state of dispersion in the starching medium to prevent the production on an ironed fabric of the unsightly streaks or smears, commonly referred to in the trade as "high spots." The viscosity of the starching medium cannot in general be wholly depended upon in safeguarding against these effects. Various types of emulsifiers have thus been proposed in the past, but none has been found to be sufficiently effective in starching solutions of low viscosity, insofar as I am aware. It has been possible to obtain more or less satisfactory wax dispersions in the so-called "thick-boiling" starches, but the stiff or "boardy" finish produced on the fabrics by the use of these very viscous starches is for many purposes undesirable. In the case of the so-called "thin-boiling" starches, the dispersions obtained have lacked the stability necessary to fully overcome the tendency of the wax particles to separate as a result of their hydrophobic nature.

Heretofore, the use of wax in starching solutions has necessitated the maintenance of temperatures in these solutions above the melting point of the wax to prevent breaking of the dispersion. The preferred embodiments of this invention use an emulsifier which forms emulsions of laundry wax of sufficient stability to permit starching to be satisfactorily carried out in solutions cooled to temperatures considerably below the melting point of the wax.

The waxes hitherto generally employed in starching solutions have been the more readily emulsifiable animal and vegetable waxes, such as beeswax, Japan wax, carnauba wax, etc. The cost of these waxes, as well as their variation in price and quantity available, has made their replacement in laundry compounds by the less readily emulsifiable but cheaper mineral or paraffin waxes desirable. This invention makes it possible to use these cheaper mineral waxes in laundry compounds and laundry wax emulsions.

The waxes suitable for use in laundry compounds must not only have the properties desired for assisting the ironing operation and contributing to the finish but they must be selected carefully for certain other characteristics. Color is important for two reasons, the waxes must not impart a color to the fabric, and the wax must not have a color that interferes with a bluing that may be used in laundering. The waxes must, therefore, be naturally light colored, or colorless, or else any color must be removed by a suitable bleaching treatment. The waxes must be selected for lack of objectionable odor. Some waxes, particularly petroleum products, have odors which would be highly undesirable in fabrics. The waxes must be selected with regard to their tendency to stain fabrics and packages. Low melting waxes and waxes containing quantities of free oil are objectionable from this standpoint. The waxes should have melting points higher than the highest temperature to which the laundry wax compound will be subjected before use, to avoid melting into and staining a package.

The preferred waxes for use in the laundry wax embodiment of the invention are broadly the mineral waxes which have the necessary physical properties and purity for use as laundry waxes. These include not only the paraffin waxes obtained in the petroleum industry, but also such similar waxes as the fossil waxes found in nature as distinguished from those obtained in the refining of petroleum. Among the petroleum waxes, I can use an ordinary white wax such, for example, as the material marketed by Socony-Vacuum Oil Company under the trademark "Paraseal," which is an ordinary household paraffin wax. Further petroleum waxes which can be used are those of the microcrystalline type such as that sold by Socony-Vacuum Oil Company under the name "Cerese wax AA." Many other petroleum waxes are known and will be found generally useful for compounding with my combination emulsifier. Among the mineral waxes of non-petroleum origin may be mentioned ozokerite, ceresin, and montan waxes. These natural or fossil waxes have physical properties approximating those of the petroleum paraffin waxes and may thus be substituted for them with substantially the same advantages in my invention.

The waxes listed above are not true waxes in the strict chemical sense of the word, but are generally known by this term in the trade. I may also use the true waxes, such as beeswax, carnauba wax, etc., but these natural waxes are more or less objectionable from the standpoint of cost. Japan wax and other waxy triglycerides can also be used. Whenever I use the word "wax" without modification, however, it is intended to include both the waxes properly so-called and the other wax-like materials.

The waxes described above are limited by considerations of use in laundry practice. Where the invention is applied to other arts, such as paper coating or the like, the selection of waxes is not so restricted because, frequently, at least, color, odor and tendency to stain will be unimportant. For the broad class of available waxes there should be included such further waxes as the soft paraffin scale waxes, which are undesirable for laundry waxes because they are too oily and smell of petroleum, the more or less highly colored natural and synthetic waxes, and others that have one or more characteristics by reason of which they are unsuitable for laundry use.

It is common practice to add water-soluble dyestuffs in laundry starching solutions. Blue dyestuffs are most frequently employed to make up the normal deficiency in blue in laundered fabrics, such deficiency being due to the residual effect of soil remaining in the fabrics after the washing operation, as well as to such other effects as the yellow cast produced by dehydration of the starch during the ironing operation. Certain embodiments of the invention provide solid laundry compounds in which an aqueous solution of dyestuff is held in a fine stage of dispersion. This dispersion is accomplished by the same improved type of emulsifier which eventually serves to disperse the wax in starching solutions. When introduced into starching solutions, of course, these compounds have their phases reversed. The water dissolved dyestuff readily passes into the outer aqueous phase of the starching solutions, within which the wax is dispersed by reorientation of the improved emulsifier of the invention. Dyestuffs of any color may thus be used in the compounds of the invention, although the use of blue dyestuffs is preferred.

The compounding of wax with dyestuff dissolved in water is not new in itself, but prior attempts in this respect have met with various manufacturing difficulties. The constant tendency of the dispersed particles of dissolved dyestuff to agglomerate or separate from the wax has resulted in uneven dye distribution in the wax cake which means different tinctorial value in different cakes and also spotty appearance of the individual cakes. According to the present invention laundry wax compositions can be produced as homogeneous dispersions of the dyestuff solution in the wax.

The invention may be applied to the preparation of compounds in which the final laundry wax is a homogeneous mixture of one or more waxes with or without other added materials. It may thus be desirable in many cases to use a mixture of a mineral wax and a fat as the laundry wax for the purpose of correcting for one or another of the physical properties or characteristics of mineral wax alone. The use of hydrogenated fish oil or other suitable fat with paraffin, for example, makes possible the production of wax cakes with a glossy surface finish entirely free from the pock-marked appearance of paraffin. When use is thus made of mixtures in the invention, the emulsifier performs its functions with reference to all constituents of the mixture, which is dispersed as an entity in the starching or other solutions.

It is to be understood that the invention as applied to laundry practice, includes the ultimate starching solution in which a wax, with or without other added materials, is dispersed by the emulsifiers to be described.

The objects of this invention are accomplished by the use of a combination dispersing agent or emulsifier invented by me and described, and claimed in my above-identified copending applications. For convenience in description these dispersing agents will be called generally a mixture of type A and type B dispersing agents.

In type A are included, in accordance with the invention, lipophilic partial esters of polyhydroxylic organic compounds and water-insoluble organic acids. Type B includes, in general, the highly hydrophilic hydroxy-polyoxyethylene ethers of type A compounds.

I have used the adjective "lipophilic" to indicate the property of a polar compound (partial ester of polyhydroxy substance) which has good oil-solubility or dispersibility and no, or very little, water-solubility. The term "highly hydrophilic" is used to signify a compound which is from readily dispersible in to completely miscible with water.

More particularly, the type A esters are obtained by combining water-insoluble organic acids, especially fatty acids having from 12 to 18 carbon atoms, such as those obtainable by hydrolysis of natural fats, oil, and waxes, or from the oxidation of paraffins, with suitable aliphatic polyhydroxylic compounds. Water-insoluble cyclic acids, such as naphthenic acids, can also be used in the preparation of the partial esters. Suitable polyhydroxylic compounds comprise ethylene glycol; di- and tri-ethylene glycol, glycerol and polyglycerols; pentaerythritol; pentitols; hexitols and the cyclic inner ethers thereof; cyclitols, such as inositol; and lower polyglycol ethers of such polyhydroxylic compounds; and other polyhydric compounds of typically hydrophile character and low molecular weight, that is, with molecular weights not higher than those of the oligosaccharides. The preferred class of low molecular weight polyhydroxylic compounds is that consisting of the polyhydric alcohols, polyhydric cyclic inner ethers of polyhydric alcohols, and polyhydric external ethers of the polyhydric alcohols.

I have found that very good results are obtained from the esters of the mixed cyclic inner ethers of the hexitols, generically termed hexitans and hexides, such as sorbitans and sorbides from sorbitol, or mannitans and mannides from mannitol.

In these type A partial esters, monoesters tend to be the most effective.

Furthermore, for esters of the polyhydroxylic compounds derivable from the hexitols, I have found that the ratio of hydroxyl value to ester value for optimum performance lies between 3 and 1, and preferably between 3 and 1.5.

These type A partial esters may be prepared by any one of several known methods; such as by direct esterification of the polyhydroxy material with free fatty acid or by alcoholysis of naturally occurring esters with polyhydroxy material, using suitable catalysts. With heat-sensitive polyhydroxylic compounds, the acid chlorides and pyridine or other suitable base may be employed.

For the preparation of my preferred type A esters, I use, as starting materials, mannitol, sorbitol, or the mixture of sorbitol and hexane pentols obtainable by the reduction of glucose, and react these polyalcohols with the organic acids under conditions leading to the formation of the corresponding cyclic inner ethers and the esterification thereof by the acid. Alternatively, I may preform the inner ethers or mixtures thereof and esterify by known methods. The following illustrate the preparation of my preferred type A esters:

*Example 1*

182 g. (1 mol) of mannitol and 256 g. (1 mol) palmitic acid were heated together in the presence of .05% NaOH, based upon total reactants, as catalyst. An atmosphere of inert gas was maintained in the reaction vessel and the ingredients were thoroughly stirred. The temperature was brought to 240° C. in 70 minutes and held at the value for 5 hours. 13 g. of decolorizing carbon were added 30 minutes before the end of the reaction period and the batch filtered. The resulting product, chiefly mannitan monopalmitate, was a yellow, waxy solid melting at 42–45° C., insoluble and difficultly dispersible in water. The hydroxyl value was 355 and the ester value was 146.

*Example 2*

182 g. (1 mol) of mannitol and 284 g. (1 mol) stearic acid were heated together in the presence of .05% NaOH as catalyst. An atmosphere of inert gas was maintained in the reaction vessel and the ingredients were thoroughly stirred. The temperature was brought to 250° C. in 70 minutes and held at that value for 5 hours.

9 g. decolorizing carbon were added 30 minutes before the end of the reaction period and the batch filtered. The resulting product, chiefly mannitan monostearate, was a light gray, brittle, waxy material, melting at 45–48° C., insoluble and undispersible in water. The hydroxyl value was 301, and the ester value was 150.

The type B material, the second component of my novel combination emulsifier, comprises the highly hydrophilic and preferably the readily water-soluble hydroxy-polyoxyethylene ethers of the type A partial esters. These ethers can be prepared by methods known to those skilled in this art. Thus, I may etherify the partial ester by heating with a preformed polyethylene glycol, or, more conveniently, by reacting the ester with ethylene oxide in the presence of suitable catalysts.

The ether-ester becomes more hydrophilic with increase in the number of $C_2H_4O$ units per mol. I have found it particularly advantageous to react the ester with from 10 to 30 mols of ethylene oxide. The longer the fatty acid radical in the ester and the greater the degree of esterification (mono-, di-, etc., ester) the more $C_2H_4O$ units are required for optimum results.

The following examples illustrate the preparation of such ethers:

*Example 3*

80 lbs. (⅕ mol) of the product of Example 1 were melted and introduced into a stirring autoclave. Heat was applied and when the temperature reached 100° C., 72.5 g. of dry sodium methylate were added as catalyst.

When the temperature reached 110° C., introduction of liquid ethylene oxide was started. In the course of 2.5 hours 176 lbs. (4 mols) ethylene oxide were added, the temperature being controlled within the range of 105 to 110° C. by the use of a cooling coil in the autoclave. The temperature was maintained at 105 to 110° C. until the ethylene oxide was consumed as indicated by return of the pressure to atmospheric.

The product was transferred to a vacuum kettle and blown with superheated steam (at 150° C.) under 10 mm. pressure with good agitation for 30 minutes. 2% of activated carbon were added and heating continued for 15 minutes after which the batch was filtered.

The weights of starting materials taken correspond to 20 mols ethylene oxide to 1 mol of ester, calculated as mannitan monopalmitate.

The product was an odorless, amber slightly viscous liquid, miscible with water in all proportions at room temperature.

*Example 4*

430 g. of the product of Example 2 were introduced into a pressure reaction bomb. 22 g. sodium methylate were added and the mixture chilled. 440 g. liquid ethylene oxide were added and the bomb capped. The reaction vessel was put in a rocking device and heat applied gradually until reaction set in as indicated by a rapid rise in temperature. The temperature was maintained at 100° C. and the maximum pressure developed was 138 lbs./in.². After the main reaction had subsided, the temperature was maintained at 100° C. until the pressure had dropped to atmospheric. The total time at 100° C. was 5 hours. The product was treated with superheated steam according to the process of Example 3. The final product was a gelatinous solid having a hydroxyl value of 193 and an ester value of 75. The compound contained approximately 10 mols ethylene oxide per mol of original ester (calculated as mannitan monostearate). This material was readily dispersible in water at room temperature.

The proportion of the A and B types of emulsifiers in my combination dispersing agent is susceptible of wide variation. The character of the waxy component, the character of the aqueous medium into which it is to be dispersed, the particular combination of A and B employed, conditions of such use as dilution, temperature, degree of agitation, etc., are factors to be considered in determining the best combination in a given case. Preferably the combination dispersing agent will contain at least 20 parts of A-type compound per 100 parts.

The relative quantity of the combination emulsifier to wax is not sharply critical. The amount needed in a given case depends on the particular waxy material, the particular combination emulsifier, the nature of the medium in which the waxy material is to be dispersed, the conditions of use such as the temperature at which the dispersion is kept, the degree of agitation of the dispersion, etc. The preferred quantity of combination emulsifier for the production of dispersions of waxy materials comprising paraffin wax is from 5% to 25% of the total weight of the composition of wax and emulsifier. Specific values in this range will be indicated in the examples. Because of the assistant dispersing action of the starch in laundry use of these wax compositions, a lower percentage of mixed emulsifier to wax can be employed than in the cases of uses where the wax must be dispersed by the mixed emulsifier alone.

The solid dispersible wax compositions of the invention are made by melting together the waxy materials and the emulsifiers or melting the ingredients separately and thereafter mixing them. The type B emulsifiers are, in general, incompatible with the wax and type A emulsifier after cooling and tend to separate therefrom and form a soft lower layer. This separation can be avoided by cooling the mixture slowly and stirring the ingredients together so that solidification occurs before there is any opportunity for stratification. Such manipulation is, however, undesirable in many cases. It is often desirable, for example, to mix the ingredients and pour the liquid mixture into shallow molds of suitable shape to form small tablets and in such a case it is impracticable to control the cooling and provide the agitation necessary to prevent separation.

I have found, however, that separation can be prevented in most cases by a simple, convenient means without necessitating special cooling or mechanical treatment. It is only necessary to add to the melted wax-emulsifier composition a small quantity of water to provide homogeneity on cooling. When the waxy material is melted with one of the combination emulsifiers the melt is cloudy because of the incompatibility of the type B ester. If water is gradually added to the melt it will be observed that the cloudiness disappears and the mixture becomes homogeneous. Such a mixture can be allowed to cool without agitation and will be found to be homogeneous. If more water be added to the melted mixture after homogeneity is achieved a point will ultimately be reached at which cloudiness reappears. The preferred homogeneous compositions contain water in an amount falling in the clear range, that is, the range between amount of water added at the disappearance of the original cloudiness and amount of water added to cause the reappearance of cloudiness. This range is readily determined for a given wax-combination emulsifier mixture. In general, from less than 1% to about 10% of water will be employed.

The use of water to produce homogeneity is especially advantageous in the manufacture of laundry wax compositions because of the desirability of including a dyestuff, such as bluing, therein. The dyestuffs are of the water-soluble variety and the same water that produces homogeneity also serves to dissolve and disperse the dyestuff uniformly throughout the composition. Where it is desired to include a dyestuff the appropriate water solution is added to the melted wax-emulsifier composition in a concentration sufficient to provide the amount of water needed for homogeneity.

The laundry practice embodiment of the invention can also be practiced without compounding the wax and combination emulsifier as a separate article. It may be preferable, particularly in commercial large scale laundering operations, to make up the wax-containing starch solution from the separate ingredients. The wax ingredient and combination emulsifiers can be melted together and added with agitation to the hot starch solution. This method provides flexibility in composition from one batch of starch solution to another. Another method is to make up a concentrated wax dispersion and add this to the body of hot starch solution. A suitable concentrated dispersion of this type can be made by mixing together with heating (above the melting points of the ingredients) wax, type A emulsifier, type B emulsifier, and water about equal in weight to the total weights of the other ingredients. The mixing can be made in various orders, for example, the emulsifiers can be dispersed in hot water and the melted wax added with agitation; or, the type B emulsifier can be dispersed in hot water and premixed wax-type A emulsifier added with agitation. Other mixing orders and techniques will be apparent to those skilled in the art. The concentrate is readily dispersible in a hot starch solution with minimum agitation.

The following specific examples are illustrative of the invention:

*Example 5*

To make a laundry wax composition the following ingredients are heated together until all are in a liquid phase and well mixed with one another:

| | Parts |
|---|---|
| Paraffin wax (American melting point 133–135° F.) | 46.4 |
| Hydrogenated fish oil (titre 113° F.) | 39.0 |
| Ester of Example 1 | 12.2 |
| Ether-ester of Example 3 | 2.4 |

One part of water is then mixed into the liquid mixture.

In producing this mixture, a steam-jacketed vessel may be used to prevent localized overheating.

The mixture is allowed to cool to approximately 140° F. at which temperature it is run into cake or other shape-forming molds. Chilling the molds facilitates removal of the molded product. As an alternative, the mixture can be allowed to solidify in suitable containers, after which it is broken up into suitable sizes or extended into suitable forms.

The much wider working temperature range permitted in starching solutions by the invention was well illustrated in the case of the material obtained according to the formula of Example 5. About 4.5 grams of this material were introduced into a boiling solution of 25 grams of "thin-boiling" starch in a liter of water. After a brief period of agitation, the oil and wax were completely emulsified by the combination of ester with ether ester. It was then found possible to cool the resulting composition to 75° F., which was well below the melting points of the wax and fat employed, with no apparent sign of the oil and wax particles breaking out of their dispersed state. Fabrics immersed in the composition at this low temperature and thereafter ironed in the usual manner showed no evidence whatever of "high spots."

*Example 6*

A laundry compound can be made by melting together the following:

| | Parts |
|---|---|
| Paraffin wax (American melting point 133–135° F.) | 35 |
| Hydrogenated fish oil (titre 113° F.) | 45 |
| Ester of Example 1 | 15 |
| Ether-ester of Example 3 | 5 |

This composition is allowed to cool slowly with constant agitation to prevent stratification. After solidification the mass can be broken up into pieces of suitable size and shape for use.

The example illustrates a composition in which the final laundry wax contains a fat in greater amount than the paraffin wax.

*Example 7*

A laundry compound can be prepared by making up a melt of paraffin wax, fat, ester and ether-ester in the proportions specified in either Example 5 or 6. The melt is allowed to cool to 140–150° F. and one part of a 5.5% aqueous solution of aniline blue is then thoroughly admixed with the melted ingredients. Thereafter, the material is run into molds or other containers, preferably at 140° F. and allowed to solidify.

The aqueous dyestuff solution makes the compound homogeneous on solidification and at the same time the emulsifying action of the ester and ether-ester results in a uniform dye distribution.

If desired, a perfuming agent may also be used in the laundry compounds of the invention. This agent may be added, in suitable amount, to the heated products prior to solidification. I prefer to use a perfuming agent of lipophile nature providing for its homogeneous admixture with the wax and other lipophilic substances employed. It may for this purpose be compounded from various aromatic chemicals and essential oils in various ways known in the art.

*Example 8*

100 parts of a "thin-boiling" starch solution are made by mixing 2.5 parts "thin-boiling" starch with an equal amount of water at room temperature and adding the slurry so-produced to the balance of the water which has meanwhile been heated to boiling.

A wax concentrate for addition to the above is made by heating 0.4 part water and adding thereto 0.04 part ester of Example 1 and 0.04 part ether-ester of Example 3. To this dispersion of emulsifiers in water is added with agitation 0.32 part melted paraffin wax (A. M. P. 133–135° F.). A smooth concentrated dispersion results which is stirred into the boiling starch solution to produce a wax-starch dispersion which can be used in the usual laundry starching of clothes.

*Example 9*

A wax composition dispersible in hot water was made by melting 80 grams paraffin wax and incorporating therein 7 grams mannitan monopalmitate and 7 grams mannitan monopalmitate hydroxy-polyoxyethylene ether with 20 oxethylene groups per mol. This mixture was cloudy but on addition of 6 grams water it became clear. On cooling, the composition was a solid homogeneous mixture which was readily dispersible in hot water.

In this example the amount of water to produce homogeneity could be varied within the range of 4 to 11 grams without changing the essential characteristics of the product.

*Example 10*

A dispersible composition was made by melting 80 grams beeswax and incorporating therein 7 grams of each of the same emulsifiers as in Example 9. This mixture was also cloudy but the addition of 3 grams water cleared it. On cooling, the composition was a solid homogeneous mixture which was readily dispersible in hot water.

The following table indicates a few more solid homogeneous dispersible wax compositions that can be made with a paraffin scale wax according to the invention. The procedure for making the composition was as in Example 9. Each of the resulting compositions was dispersible in hot water to form homogeneous stable wax dispersions.

| Example | Parts wax | Type A compound | Parts A | Type B compound | Parts B | Per cent water |
|---|---|---|---|---|---|---|
| 11 | 80 | Mannitan monopalmitate | 2 | Mannitan monopalmitate hydroxy polyoxyethylene ether with 20 oxyethylene groups per mol. | 2 | 1 |
| 12 | 80 | do | 3.5 | do | 6.5 | 2.5 |
| 13 | 80 | do | 13 | do | 7 | 1 |
| 14 | 80 | Mannitan monomyristate | 5 | Mannitan monomyristate hydroxy polyoxyethylene ether with 20 oxyethylene groups per mol. | 5 | 2.8 |
| 15 | 80 | Mannitan monostearate | 5 | Mannitan monostearate hydroxy polyoxyethylene ether with 20 oxyethylene groups per mol. | 5 | 3.5 |
| 16 | 80 | Sorbitan monooleate | 5 | Sorbitan monooleate hydroxy polyoxyethylene ether with 20 oxyethylene groups per mol. | 5 | 2.7 |
| 17 | 80 | Mannitan monopalmitate | 5 | do | 5 | 3.5 |

The above examples are illustrative only and do not represent the only embodiments of the invention. The mannitan monopalmitate and the ether thereof containing about 20 oxyethylene groups per mol are the preferred emulsifiers. However, many other emulsifiers can be used. My copending application Serial Number 395,392 contains examples of many other emulsifier combinations by way of further examples of emulsifiers falling within my definition. Other type A esters disclosed in said copending application are sorbitan monolaurate, mannitan monooleate, mixed monolaurates of mannitan and glycerol, glycerol monopalmitate, sorbitan mononaphthenate. The type B emulsifiers include sorbitan monolaurate polyoxyethylene ether with 20 oxyethylene groups per mol, mannitan monooleate polyoxyethylene ether with 16 oxyethylene groups per mol, mannitan monooleate polyoxyethylene ether with 12 oxyethylene groups per mol, and mannitan dilaurate polyoxyethylene ether with 12 oxyethylene groups per mol. The combination emulsifiers may be formed of esters and ether-esters with like or unlike polyhydroxylic residues and like or unlike ac'd residues.

The invention is to be regarded as limited only by the scope of the following claims.

I claim:

1. A solid wax composition comprising a solid wax as the major constituent; and a mixed dispersing agent for said wax comprising a lipophilic partial ester of a low molecular weight hydrophilic polyhydroxylic organic compound and a long chain fatty acid, and a highly hydrophilic hydroxy-polyoxyethylene ether of a lipophilic partial ester of a low molecular weight hydrophilic polyhydroxylic organic compound and a long chain fatty acid, said hydroxy-polyoxyethylene ether containing at least 10 oxyethylene groups; said lipophilic partial ester comprising at least 20% of the said mixed dispersing agent and the hydroxy-polyoxyethylene ether being in a sufficient amount in association with said lipophilic partial ester to readily disperse said wax in a hot aqueous medium to form a stable homogeneous wax dispersion.

2. A composition as in claim 1 wherein the said fatty acid has from 12 to 18 carbon atoms.

3. A solid laundry compound comprising a solid laundry wax as the major constituent; and a mixed dispersing agent for said wax comprising a lipophilic partial ester of a low molecular weight hydrophilic polyhydroxylic organic compound and a long chain fatty acid, and a highly hydrophilic hydroxy-polyoxyethylene ether of a lipophilic partial ester of a low molecular weight hydrophilic polyhydroxylic organic compound and a long chain fatty acid, said hydroxy-polyoxyethylene ether containing at least 10 oxyethylene groups; said lipophilic partial ester comprising at least 20% of the said mixed dispersing agent and the hydroxy-polyoxyethylene ether being in a sufficient amount in association with said lipophilic partial ester to readily disperse said laundry wax in a hot starching solution to form a stable homogeneous laundry wax dispersion.

4. A solid wax composition comprising a solid wax as the major constituent; a mixed dispersing agent for said wax comprising a lipophilic partial ester of a low molecular weight hydrophilic polyhydroxylic organic compound and a long chain fatty acid, and a highly hydrophilic hydroxy-polyoxyethylene ether of a lipophilic partial ester of a low molecular weight hydrophilic polyhydroxylic organic compound and a long chain fatty acid, said hydroxy-polyoxyethylene ether containing at least 10 oxyethylene groups; and water in a quantity sufficient to clarify the mixture of wax and dispersing agent when they are in molten condition; said lipophilic partial ester comprising at least 20% of the mixed dispersing agent, and the hydroxy-polyoxyethylene ether being in a sufficient amount in association with the said lipophilic partial ester to readily disperse said wax in a hot aqueous medium to form a stable homogeneous wax dispersion.

5. A solid laundry compound comprising a solid laundry wax as the major constituent; a mixed dispersing agent for said wax comprising a lipophilic partial ester of a low molecular weight hydrophilic polyhydroxylic organic compound and a long chain fatty acid, and a hydrophilic hydroxy-polyoxyethylene ether of a lipophilic partial ester of a low molecular weight hydrophilic polyhydroxylic organic compound annd a long chain fatty acid, said hydroxy polyoxyethylene ether containing at least 10 oxyethylene groups; and water in a quantity sufficient to clarify the mixture of wax and dispersing agent when they are in molten condition; said lipophilic partial ester comprising at least 20% of said mixed dispersing agent, and the hydroxy-polyoxyethylene ether being in a sufficient amount in association with said lipophilic partial ester to readily disperse said laundry wax in a hot starching solution to form a stable homogeneous laundry wax dispersion.

6. A solid laundry compound as in claim 5 wherein the said water is added in the form of an aqueous solution of a dyestuff.

7. A laundry compound as in claim 5 wherein the said fatty acid has from 12 to 18 carbon atoms.

8. A solid wax composition as in claim 1 wherein the said low molecular weight polyhydroxylic organic compound is selected from the group consisting of polyhydric alcohols, polyhydroxylic cyclic inner ethers of polyhydric alcohols and polyhydroxylic external ethers of polyhydric alcohols; and wherein the said long chain fatty acid contains from 12 to 18 carbon atoms.

9. A solid wax composition comprising a solid wax as the major constituent, and a mixed dispersing agent for said wax comprising a lipophilic partial ester of a fatty acid with from 12 to 18 carbon atoms and a polyhydroxylic cyclic inner ether of a hexitol, and a highly hydrophilic hydroxy-polyoxyethylene ether of a lipophilic partial ester of a fatty acid with from 12 to 18 carbon atoms and a polyhydroxylic cyclic inner ether of a hexitol, said hydroxy-polyoxyethylene ether containing at least 10 oxyethylene groups; said lipophilic partial ester comprising at least 20% of the said mixed dispersing agent, and the hydroxy-polyoxyethylene ether being in a sufficient amount in association with said lipophilic partial ester to readily disperse said wax in a hot aqueous medium to form a stable homogeneous wax dispersion.

10. A solid laundry compound comprising as the major constituent a solid laundry wax consisting essentially of mineral wax and a fat; and a mixed dispersing agent for said wax, comprising mannitan monopalmitate and the hydroxy-polyoxyethylene ether thereof containing about 20 oxyethylene groups; said mannitan monopalmitate comprising at least 20% of the said mixed dispersing agent, and the said hydroxy-polyoxyethylene ether being in a sufficient amount in association with said mannitan monopalmitate to readily disperse said laundry wax in a hot starching solution to form a stable homogeoneous laundry wax dispersion.

11. A laundry wax composition adapted to be emulsified in a hot aqueous solution of laundry starch, comprising about 35 to 46.4 parts paraffin wax, 45 to 39 parts hydrogenated fish oil, 15 to 12.2 parts partial palmitic acid ester of cyclic inner ether derivable from mannitol, said ester containing largely mannitan monopalmitate, and 5 to 2.4 parts of hydroxy-polyoxyethylene ether of said ester containing about 20 oxyethylene groups.

12. A laundry wax as in claim 11 which also contains about 1 part of an aqueous solution of a bluing dyestuff.

13. A starching composition comprising a starching solution; a solid laundry wax; and a minor quantity relative to said wax of a mixed dispersing agent for said wax, said dispersing agent comprising a lipophilic partial ester of a low molecular weight hydrophilic polyhydroxylic organic compound and a long chain fatty acid, and a highly hydrophilic hydroxy-polyoxyethylene ether of a lipophilic partial ester of a low molecular weight hydrophilic polyhydroxylic organic compound and a long chain fatty acid, said hydroxy-polyoxyethylene ether containing at least 10 oxyethylene groups; said lipophilic partial ester comprising at least 20% of the said mixed dispersing agent, and said hydroxy-polyoxyethylene ether being in a sufficient amount in association with said lipophilic partial ester to readily disperse said laundry wax in said starching solution to form a stable homogeneous wax dispersion.

14. A starching composition for use in laundering comprising a starching solution; a solid laundry wax comprising a mixture of mineral wax and fat dispersed in said solution; and a minor quantity relative to said laundry wax of a mixed dispersing agent for said laundry wax, said dispersing agent comprising a lipophilic partial ester of a low molecular weight hydrophilic polyhydroxylic organic compound and a fatty acid with from 12 to 18 carbon atoms, and a highly hydrophilic hydroxy-polyoxyethylene ether of a lipophilic partial ester of a low molecular weight hydrophilic polyhydroxylic organic compound of a fatty acid with from 12 to 18 carbon atoms, said hydroxy-polyoxyethylene ether containing at least 10 oxyethylene groups; said lipophilic partial ester comprising at least 20% of the said mixed dispersing agent and said hydroxy-polyoxyethylene ether being in a sufficient amount in association with said lipophilic partial ester to readily disperse said laundry wax in said starching solution to form a stable homogeneous laundry wax dispersion.

15. A solid wax composition comprising a solid wax as the major constituent; and a mixed dispersing agent for said wax comprising a monoester of a fatty acid with from 12 to 18 carbon atoms and a polyhydroxylic cyclic inner ether of a hexitol, and a hydroxy-polyoxyethylene ether of a monoester of a fatty acid with from 12 to 18 carbon atoms and a polyhydroxylic cyclic inner ether of a hexitol, said hydroxypolyoxyethylene ether containing from 10 to 30 oxyethylene groups; said monoester comprising at least 20% of the said mixed dispersing agent, and a hydroxy-polyoxyethylene ether being in a sufficient amount in association with said monoester to readily disperse said wax in a hot aqueous medium to form a stable homogeneous wax dispersion.

16. A solid laundry compound comprising a solid laundry wax as the major constituent; and a mixed dispersing agent for said wax comprising a monoester of a fatty acid with from 12 to 18 carbon atoms and a polyhydroxylic cyclic inner ether of a hexitol, and a hydroxypolyethylene ether of a monoester of a fatty acid with from 12 to 18 carbon atoms and a polyhydroxylic cyclic inner ether of a hexitol, said hydroxy-polyoxyethylene ether containing from 10 to 30 oxyethylene groups; said monoester comprising at least 20% of the said mixed dispersing agent, and the hydroxy-polyoxyethylene ether being in a sufficient amount in association with said monoester to readily disperse said laundry wax in a hot starching solution to form a stable homogeneous laundry wax dispersion.

17. A solid wax composition comprising a solid wax as the major constituent; a mixed dispersing agent for said wax comprising a lipophilic partial ester of a fatty acid with from 12 to 18 carbon atoms and a low molecular weight polyhydroxylic organic compound selected from the group consisting of polyhydric alcohols, polyhydroxylic cyclic inner ethers of polyhydric alcohols, and polyhydroxylic external ethers of polyhydric alcohols and a highly hydrophilic hydroxy-polyoxyethylene ether of a lipophilic partial ester of a fatty acid with from 12 to 18 carbon atoms and a low molecular weight polyhydroxylic organic compound selected from the said group, said hydroxy-polyoxyethylene ether containing at least 10 oxyethylene groups; and water in a quantity sufficient to clarify the mixture of wax and dispersing agent when they are in molten condition; said lipophilic partial ester comprising at least 20% of the said mixed dispersing agent, and the hydroxy-polyoxyethylene ether being in a sufficient amount in association with said lipophilic partial ester to readily disperse said wax in a hot aqueous medium to form a stable homogeneous wax dispersion.

18. A wax composition as in claim 17, wherein the said wax is a solid paraffin wax.

WILLIAM C. GRIFFIN.

CERTIFICATE OF CORRECTION.

Patent No. 2,374,931.  May 1, 1945.

WILLIAM C. GRIFFIN.

It is hereby certified that error appears in the printed specification of the above numbered patent requiring correction as follows: Page 2, second column, line 6, for the word "stage" read --state--; page 6, second column, line 21, claim 5, for "annd" read --and--; page 7, second column, line 12, claim 15, for "and a" read --and the--; and that the said Letters Patent should be read with this correction therein that the same may conform to the record of the case in the Patent Office.

Signed and sealed this 7th day of August, A. D. 1945.

(Seal)

Leslie Frazer
Acting Commissioner of Patents.